United States Patent
Wang et al.

(10) Patent No.: US 11,343,246 B2
(45) Date of Patent: May 24, 2022

(54) PROVIDING ISOLATED CONTAINERS FOR USER REQUEST PROCESSING

(71) Applicant: International Business Machines Corporation, Armonk, NY (US)

(72) Inventors: Heng Wang, Beijing (CN); Xiao Ling Chen, Beijing (CN); Chen Guang Liu, Beijing (CN); Wen Qi WQ Ye, Beijing (CN); Fei Tan, Beijing (CN); Lu Lu, Beijing (CN); Jing Li, Beijing (CN); Qing Yu Pei, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 17/037,953

(22) Filed: Sep. 30, 2020

(65) Prior Publication Data

US 2022/0103550 A1 Mar. 31, 2022

(51) Int. Cl.
G06F 15/16 (2006.01)
H04L 29/06 (2006.01)
H04L 67/01 (2022.01)

(52) U.S. Cl.
CPC ......... *H04L 63/0876* (2013.01); *H04L 67/42* (2013.01)

(58) Field of Classification Search
CPC .............................. H04L 63/0876; H04L 67/42
See application file for complete search history.

(56) References Cited

U.S. PATENT DOCUMENTS

| | | | | |
|---|---|---|---|---|
| 7,281,133 | B2 * | 10/2007 | Ginter | H04N 7/17309 713/181 |
| 7,644,443 | B2 * | 1/2010 | Matsuyama | H04N 21/4627 726/27 |
| 9,282,100 | B2 | 3/2016 | Clark | |
| 9,515,999 | B2 * | 12/2016 | Ylonen | H04L 63/065 |
| 9,942,042 | B1 * | 4/2018 | Friedman | H04L 9/3231 |
| 10,554,663 | B2 * | 2/2020 | Ganda | G06F 21/6209 |
| 10,587,697 | B2 * | 3/2020 | Drasin | H04L 67/141 |
| 2002/0027992 | A1 * | 3/2002 | Matsuyama | H04L 63/0428 348/E7.071 |
| 2013/0212653 | A1 * | 8/2013 | Hoghaug | G06F 21/34 726/5 |
| 2016/0026813 | A1 | 1/2016 | Neitzel | |
| 2016/0182500 | A1 * | 6/2016 | Ligatti | H04L 63/0823 713/156 |

(Continued)

FOREIGN PATENT DOCUMENTS

CN 110099044 A 8/2019
WO 20192003171 A1 10/2019

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Ramy M Osman
*Assistant Examiner* — Thorne E Waugh
(74) *Attorney, Agent, or Firm* — Christopher M. Pignato

(57) ABSTRACT

Methods, computer program products, and/or systems are provided that can perform the following operations: receiving a connection request from a first user device; creating an authentication container for the first user device; authenticating the first user device using the authentication container; in response to authentication for the first user device being successful, creating a first user request processing container for the first user device; and processing user requests received from the first user device using the first user request processing container.

18 Claims, 6 Drawing Sheets

(56) References Cited

U.S. PATENT DOCUMENTS

2017/0098072 A1    4/2017  Stopel
2019/0312800 A1   10/2019  Schibler
2019/0377864 A1*  12/2019  Mossoba ................. G06F 21/42

* cited by examiner

PROVIDING ISOLATED CONTAINERS FOR USER REQUEST PROCESSING

BACKGROUND

The present invention relates generally to user request processing, and more particularly to providing for isolating privilege separated connections of clients when processing user requests received from local and/or remote user devices.

Currently, more and more services are provided by network servers. Service users can access the services through different types of network connections between user devices and the network servers. User requests can be sent from the user devices and received by the network servers. The network servers can process the user requests and provide response to the user devices.

SUMMARY

According to aspects of the present invention, there is provided a computer-implemented method, computer program product, and/or a system that performs the following operations (not necessarily in the following order): receiving a connection request from a first user device; creating an authentication container for the first user device; authenticating the first user device using the authentication container; in response to authentication for the first user device being successful, creating a first user request processing container for the first user device; and processing user requests received from the first user device using the first user request processing container.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
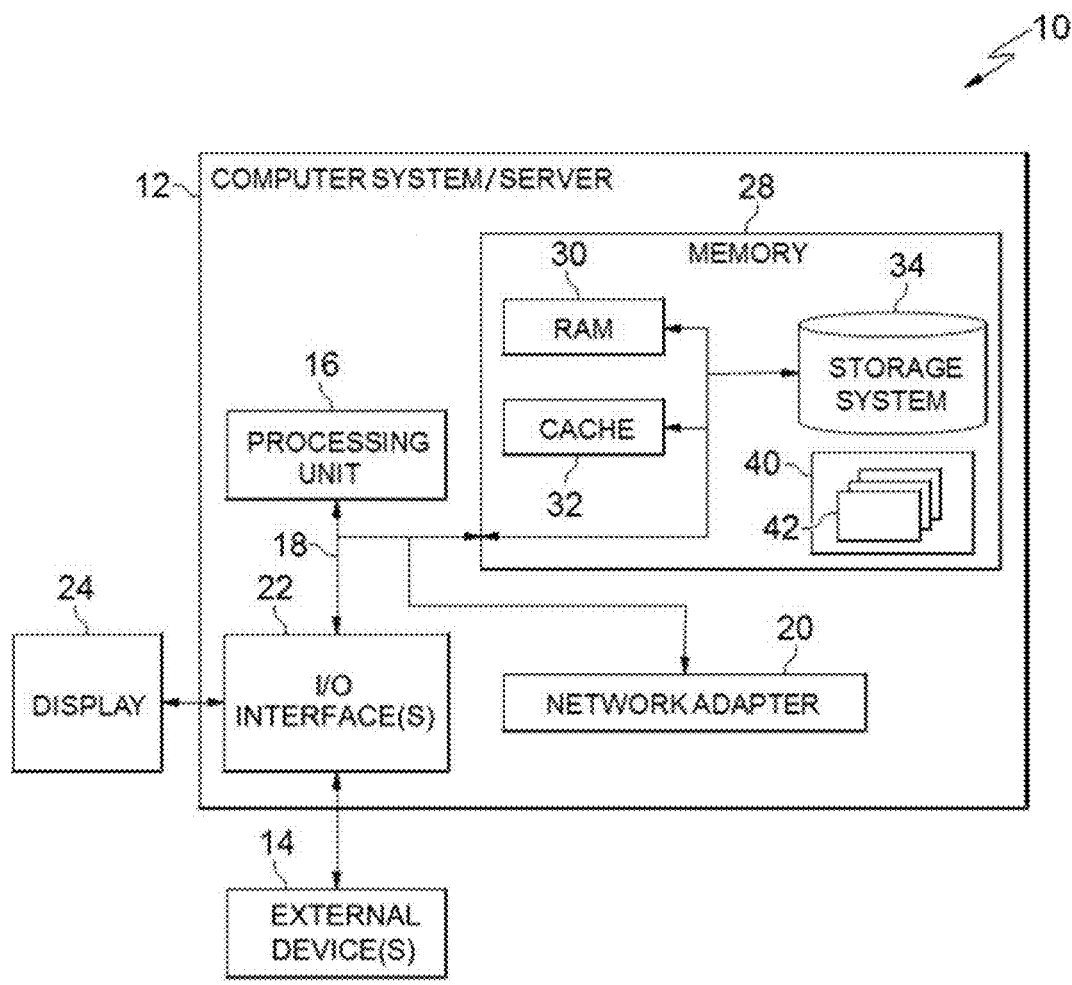
FIG. 1 depicts a cloud computing node, according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic diagram of an example of a cloud computing node 10 is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Cloud computing node 10 can include a computer system/server 12 or a portable electronic device such as a communication device, which is operational with numerous other general-purpose or special-purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, data archival storage systems, and/or the like.

Figure 2:
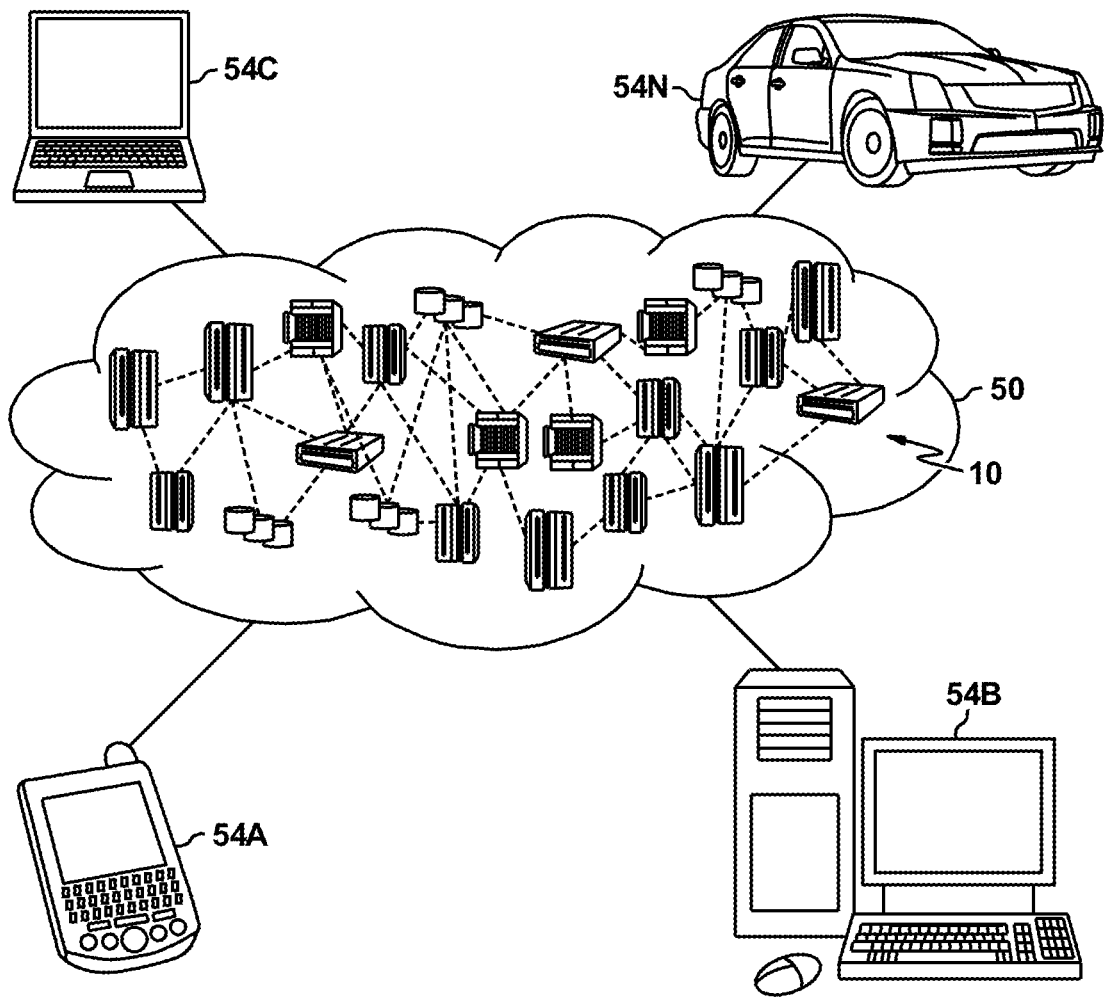
FIG. 2 depicts a cloud computing environment, according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
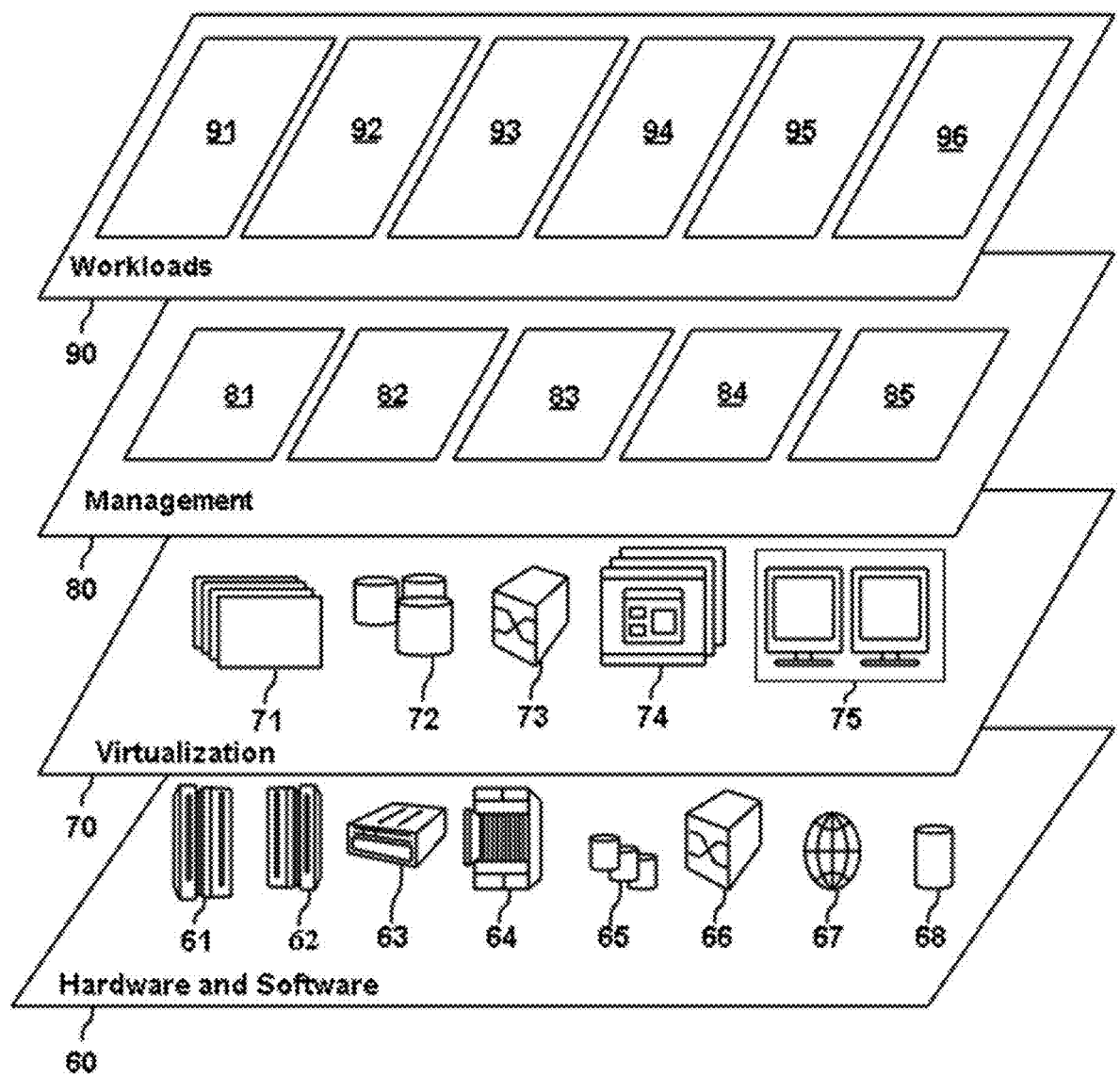
FIG. 3 depicts abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user request processing 96.

In general, network servers may use an unprivileged child process to contain and restrict effects of programming errors. A bug in the unprivileged child process does not result in a system compromise. For some, security vulnerabilities in the unprivileged child process can have potential security effects on the services hosted on the network servers, such as privilege escalation, obtaining sensitive information, infinite loop and CPU consumption, etc.

However, by utilizing some Common Vulnerabilities and Exposures (CVEs), network attackers may consume computing resource of servers to maliciously cause a denial of service, to escalate user permission maliciously, or to implement unauthorized access to the servers.

According to aspects of the present disclosure, systems and methods can be provided to protect server resources, for example, from security vulnerability attacks, by isolating a privilege separated connection of a client. In particular, the systems and methods of the present disclosure can provide for creating an isolated container in response to a connection request and creating user processes inside the container. The systems and methods of the present disclosure can also provide for preparing, assigning, and/or limiting computing resources (e.g., input/output, volumes, memory, CPU resources, etc.) for the container.

Figure 4:
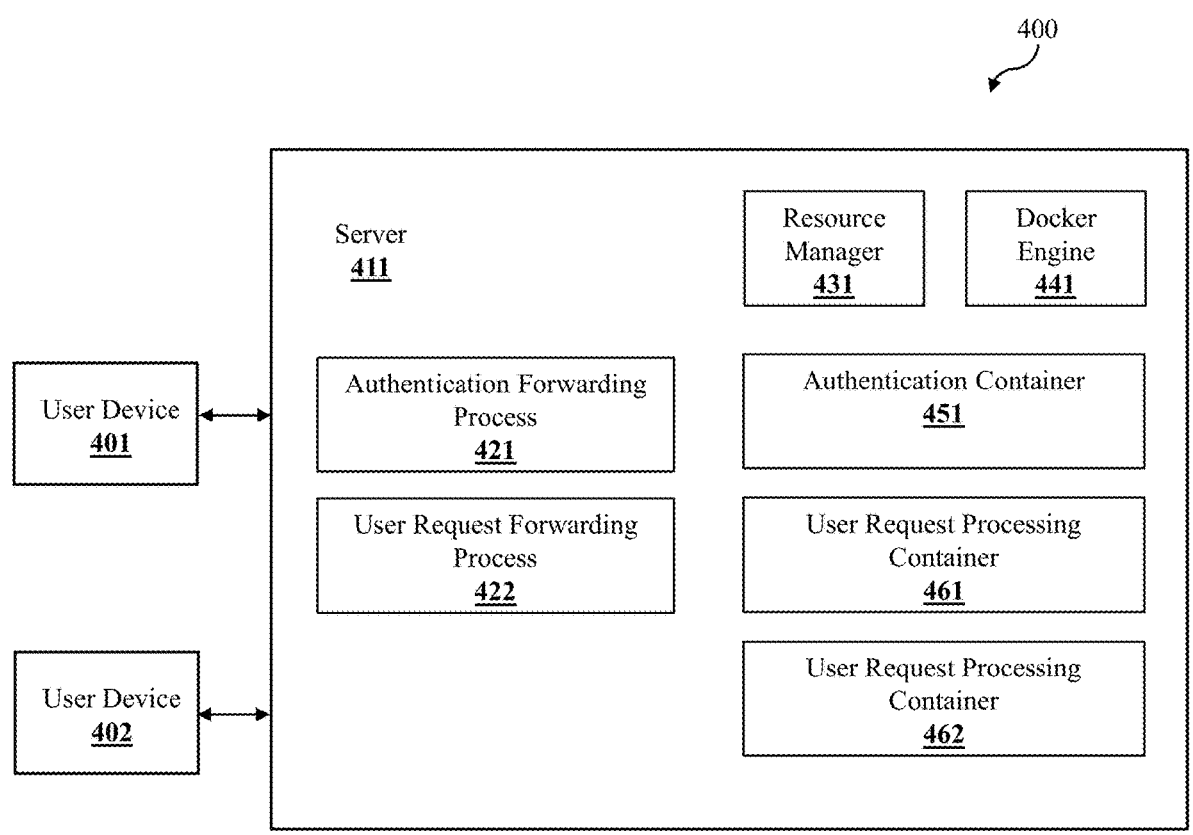
FIG. 4 depicts a schematic diagram of a network environment for user request processing, according to an embodiment of the present invention.

Referring now to FIG. 4, an example network environment 400 is depicted according to embodiments of the present disclosure. As an example, user devices 401/402 can connect to a server 411 through data links. The user devices 401/402 can be any type of device (including physical or virtual devices) that can be used for sending/receiving data. The server 411 can be any type of device (including physical or virtual devices) that can be used to process user requests and provide network services. The server 411 may comprise multiple modules. Those modules of the server 411 can be located in a same physical device or in different physical devices associated with the server 411. Some modules can also be located in a device outside of, but accessible to, the server 411. The data links between the user devices 401/402 and the server 411 can be direct or indirect. The data link can be a wired or wireless link which can be used for communication between devices, such as a Local Area Network (LAN) link, a Wide Area Network (WAN) link, an Internet link, a cellular network link, and/or the like.

In some embodiments, the server 411 can be a server supporting the OpenSSH protocol, SSH protocol, and/or the like. In some embodiments, the server 411 can also be an Apache web server. It should be understood that the server 411 can also support other types of network protocols now known or to be developed in the future. In some embodiments, the user devices 401/402 can be a cloud computing node, such as the cloud computing node 10 shown in FIG. 1 and/or FIG. 2.

According to aspects of the present disclosure, in some embodiments, the user device 401 can send a connection request to the server 411. As an example, the connection request can be a message or a data packet. The connection request may include an Internet Protocol (IP) address and/or a media access control (MAC) address of the user device 401. Using the OpenSSH protocol as an example, the connection request can be a message that initiates SSH (secure shell) protocol negotiation and Crypto negotiation between the user device 401 and the server 411. For other types of protocols supported by the server 411 and the user device 401, the connection request can be a message that can initiate following processing to establish a connection between the server 411 and the user device 401.

In some embodiments, in response to receiving the connection request, the server 411 can create an authentication forwarding process 421 based, at least in part, on the received connection request. As an example, if the server 411 determines the received connection request is to be processed in an un-privileged process, the created authentication forwarding process 421 can be an un-privileged process. In describing principles of the present disclosure, the authentication forwarding process 421 can also be referred to as the first forwarding process. In some other embodiments, after receiving the connection request, the server 411 can create the authentication forwarding process 421 as a privileged process. As an example, a system operation or system call (such as, "fork") can be used to create the authentication forwarding process 421 based on a process currently running in the server 411. The process which initiates the system operation or system call (such as, "fork") can be deemed a parent process and the newly created process can be its child process. In some other embodiments, a system operation "spawn" can also be used to create the authentication forwarding process 421. It shall be understood that the above-mentioned system operations are merely examples to describe embodiments of the present disclosure and any other system operations or system calls now known or to be developed can be used by the server 411 to create the authentication forwarding process 421.

According to aspects of the present disclosure, an authentication container 451 can be created, for example, by a docker engine 441 of the server 411. It should be understood that the sequence of creating the authentication forwarding process 421 and creating the authentication container 451 can be optional. The server 411 can create the authentication forwarding process 421 before, in parallel with, or after creating the authentication container 451.

In some embodiments, the authentication container 451 can be dedicated to the user device 401. Different user devices can be authenticated using different authentication container. For example, the user device 402 can be authenticated using another authentication container different from the authentication container 451.

A resource manager 431 of the server 411 can prepare computing resources to be assigned to the authentication container 451. The computing resources can include, but are not limited to, input/output (I/O), volumes (directories), processing units, memory, and/or the like. In some embodiments, the computing resources to be assigned to the authentication container 451 are preset by administrators of the server 411. In some embodiments, the computing resources to be assigned to the authentication container 451 can be determined based on features of the user device 401, and/or other features, such as computing resources available in the server 411, resource requests from other user devices, and/or the like. In some embodiments, containers can be isolated from one another and have their own software, libraries, files, and/or the like.

In some other embodiments, the authentication container 451 can be shared among one or more user devices (such as, the user devices 401/402). If an available authentication container is detected to be existing in the server 411 (such as, an authentication container that has been created in the server 411 for the user device 402), the available authentication container can be obtained and applied for the user device 401. In this example, the creating of the authentication container 451 by the docker engine 441 may include obtaining the available authentication container, wherein the obtained available authentication will be referred to as the authentication container 451.

After creating the authentication container 451, an identifier associated with the authentication container 451 can be provided to the authentication forwarding process 421. As an example, the identifier of the authentication container 451 can be a port number, a Universally Unique Identifier (UUID), a serial number, a tag, and/or the like associated with the authentication container 451. It should be understood that other types of identifiers can also be applied in embodiments of the present invention. In some embodiments, the authentication container 451 can be mapped to a port number of the server 411, and the port number of the server 411 can also be used as an identifier of the authentication container 451. The authentication forwarding process 421 can then use the identifier associated with the authentication container 451 to forward data obtained from the authentication container to a device outside of the server 411, and/or forward data received from a device outside of the server 411 to the authentication container. In some embodiments, the authentication forwarding process 421 can be shared among different authentication containers, and the authentication forwarding process 421 can obtain identifiers of authentication containers respectively created for different user devices.

According to aspects of the present disclosure, the user device 401 can be authenticated using the authentication container 451. The authentication container 451 can provide an authentication request to the authentication forwarding process 421, and then the authentication forwarding process 421 can forward the authentication request to the user device 401. In an example, the authentication request can be obtained by the authentication forwarding process 421, and the authentication forwarding process 421 can map the authentication request with the identifier associated with the authentication container 451. The authentication request can be sent to the user device 401 to request the user device 401 to provide authentication materials, such as an account and/or password of the user device 401, and/or the like.

The user device 401 can send an authentication response to the server 411, and the authentication response can be received using the authentication forwarding process 421. The authentication forwarding process 421 can map the received authentication response with the identifier associated with the authentication container 451. The authentication forwarding process 421 can then deliver the authentication response to the authentication container 451 based on the identifier of the authentication container 451 that was mapped to the received authentication response. In an example, the authentication forwarding process 421 can monitor the port number of the server 411 mapping with the authentication container 451, and then deliver the received authentication response to the authentication container 451 based on the port number of the server 411.

In some embodiments, the authentication container 451 can authenticate the user device 401 based on the received authentication response. If the authentication for the user device 401 is successful (such as, the user device 401 provides a valid account and/or a password), the user device 401 can be authorized to access services provided by the server 411. If the authentication for the user device 401 fails, the user device 401 will not be authorized to access the services.

According to aspects of the present disclosure, in response to the authentication for the first user device being successful, a user request processing container 461 can be created by the docker engine 441 for the user device 401. User requests from the user device 401 can be processed in the user request processing container 461. As an example, the user requests from the user device 401 may include requests sent from the user device 401 for accessing services and/or files provided by the server 411.

The resource manager 431 can prepare computing resources to be assigned to the user request processing container 461. The computing resources can include, but are not limited to, input/output (I/O), volumes (directories), processing units, memory, etc. In some embodiments, the computing resources to be assigned to the user request processing container 461 are preset by administrators of the server 411. In some embodiments, the computing resources to be assigned to the user request processing container 461 can be determined based on features of the user device 401, and/or other features, such as computing resources available in the server 411, resource requests from other user devices, and/or the like. As an example, a root and directories (such as, /Home/User1/.ssh/ or the like) can be assigned to the user request processing container 461 for the user device 401.

In some embodiments, the server 411 can create a user request forwarding process 422 before, in parallel with, or after creating the user request processing container 461. In describing principles of the present disclosure, the user request forwarding process 422 can also be referred to as the second forwarding process. As an example, a system operation or system call (such as, "fork") can be used to create the user request forwarding process 422 based on a process currently running in the server 411. In some other embodiments, a system operation "spawn" can also be used to create the user request forwarding process 422. It should be understood that the above-mentioned system operations are merely examples to describe embodiments of the present invention and any other system operation or system call now known or to be developed can be used by the server 411 to create the user request forwarding process 422.

After creating the authentication container 461, an identifier associated with the user request processing container 461 can be provided to the user request forwarding process 422. As an example, the identifier of the user request processing container 461 can be a port number, a Universally Unique Identifier (UUID), a serial number, a tag, and/or the like, associated with the user request processing container 461. It should be understood that other types of identifiers can also be applied in embodiments of the present invention. In some embodiments, the user request processing container 461 can be mapped with a port number of the server 411, and the port number of the server 411 can also be used as an identifier of the user request processing container 461. The user request forwarding process 422 can then use the identifier associated with the user request processing container 461 to forward data packets provided by the user request processing container 461 to the user device 401, and/or deliver data packets received from the user device 401 to the user request processing container 461. In some embodiments, the user request forwarding process 422 can be shared among different user request processing containers, and the user request forwarding process 422 can obtain identifiers of user request processing containers respectively created for different user devices.

In some embodiments, when the user device 401 requests to access a service and/or files provided by the server 411, the user requests can be received from the user device 401 using the user request forwarding process 422. The user request forwarding process 422 can map the received user requests with the identifier associated with the user request processing container 461. The user request forwarding process 422 can then deliver the user requests to the user request processing container 461 based on the identifier associated with the user request processing container 461. In an example, the user request forwarding process 422 can monitor the port number of server 411 mapping with the user request processing container 461, and then deliver the received user requests to the user request processing container 461 based on the port number of server 411. The user requests can be processed in the user request processing container 461. The user device 401 can only access services and/or files comprised in the resources of the user request processing container 461 which are prepared by the resource manager 431.

The user request processing container 461 can process user requests received from the device 401 and provide responses for the user requests to the user request forwarding process 422. In this example, the responses can be obtained by the user request forwarding process 422. The user request forwarding process 422 can map the responses with the identifier associated with the user request processing container 461. In some embodiments, an unprivileged process can be established inside the user request processing container 461 to process the user requests and provide the responses. Then the user request forwarding process 422 can forward the responses provided by the user request processing container 461 to the user device 401.

According to aspects of the present disclosure, the user request processing container 461 is dedicated to the user device 401, and user requests received from another user device (e.g., the user device 402) are processed in another user request processing container (such as, user request processing container 462) different from the user request processing container 461. As an example, if the user device 402 is authenticated to be valid, a user request processing container 462 can be created for the user device 402 to process user requests from the user device 402. The user request processing containers 461 and 462 may have different roots and directories. As an example, access restricted resources assigned to the user request processing container 461 are not assigned to the user request processing container 462. For example, "/Home/User1/.ssh/" can be set as only accessible by the user device 401, and "/Home/User2/.ssh/" can be set as only accessible by the user device 402. As a result, the user device 401 cannot access directories authorized only for the user device 402 (e.g., "/Home/User2/.ssh/"), and the user device 402 cannot access directories authorized only for the user device 401 (e.g., "/Home/User1/.ssh/"). As such, even if a malicious user escalates its privilege, for example, through security vulnerabilities, it will generally not affect the host server and other connections and users. Additionally, even in a case of escalating to the root, for example, through use of some CVEs, the user device 401 can only access the root of the user request processing container 461 and cannot access the root of the server 411.

According to aspects of the present disclosure, the server 411 can create an isolated user request processing container 461 when privilege separation occurs, can then create a process or processes inside the user request processing container 461, and can limit resources such as I/O, volumes, memory, CPU resources, and/or the like assigned to the user request processing container 461. The connection between the user device 401 and the process inside the user request processing container 461 can then be established. As such, embodiments of the present disclosure can provide for more effectively protecting network servers, for example, from vulnerability attacks.

Figure 5:
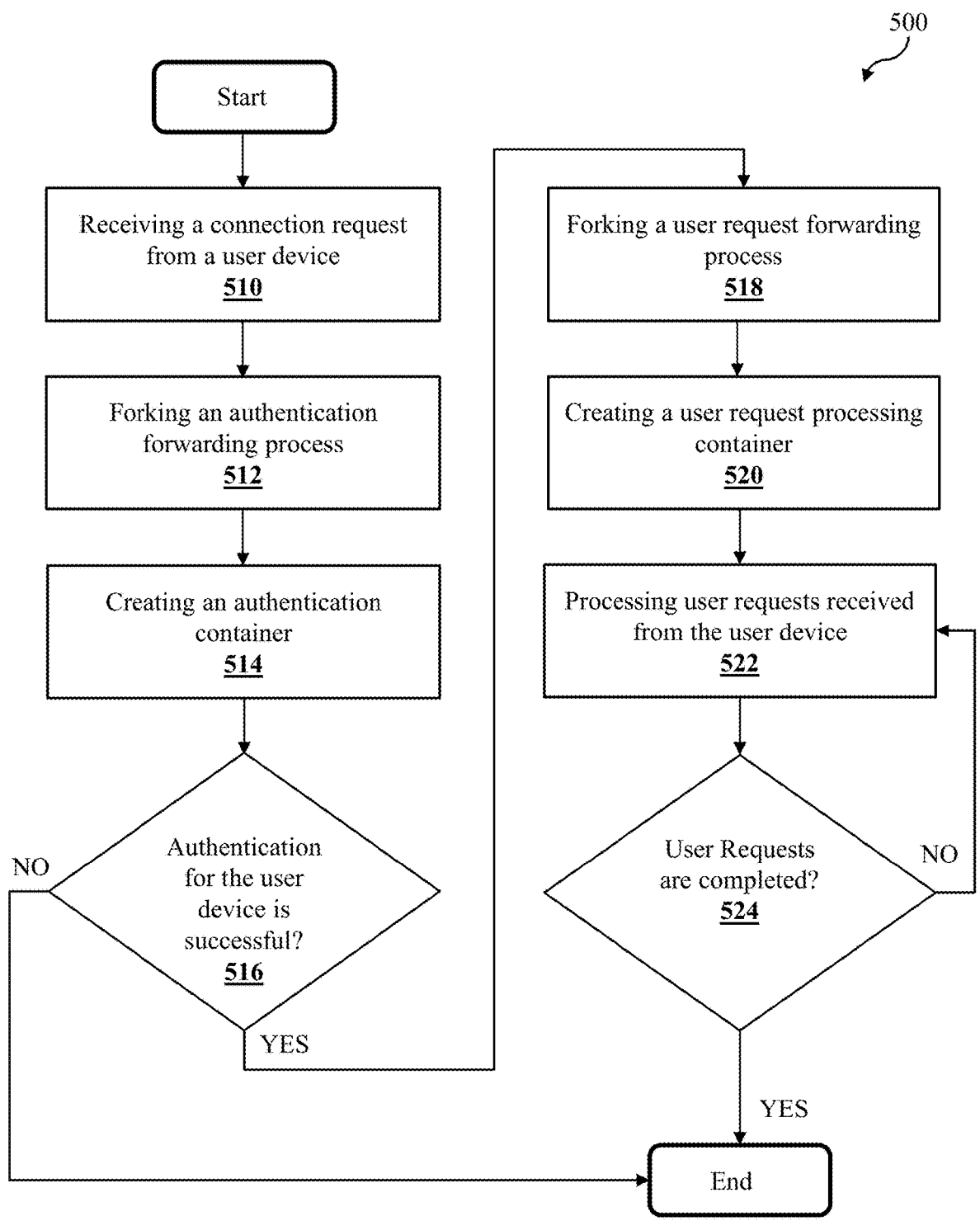
FIG. 5 depicts a flow chart of an example method for user request processing implemented by a server, according to an embodiment of the present invention.

FIG. 5 shows a flowchart of operations 500 for user request processing which can, for example, be implemented by a server (e.g., server 411 of FIG. 4, etc.), according to an embodiment of the present disclosure. It should be noted that the operations 500 are illustrative for the purposes of discussion and are not intended to suggest any limitation as to the scope of use or functionality of embodiments of the present invention.

Operations begin at block 510, where the server receives a connection request from a user device. Operations proceed to block 512, where, in response to receiving the connection request, the server can create an authentication forwarding process based, at least in part, on the received connection request. Operations proceed to block 514, where the server can create an authentication container for the user device. It should be understood that the described sequence of operations at block 512 and block 514 can be different in some embodiments. In alternative embodiments, the server may create the authentication forwarding process before, in parallel with, or after creating the authentication container. The authentication forwarding process can use an identifier associated with the authentication container to forward data from the authentication container to the user device, and/or forward data from the user device to the authentication container.

The user device can then be authenticated using the created authentication container. If, at block 516, the authentication for the user device fails, operations can end, the requests from the user device can be rejected, and the user device will not be authorized to access services and/or files provided by the server.

If, at block 516, the authentication for the user device is successful, operations proceed to block 518, where the server can create a user request forwarding process for the user device. Operations proceed to block 520, where the server can create a user request processing container for the user device. It should be understood that the described sequence of operations at block 518 and block 520 can be different in some embodiments. In alternative embodiments, the server can create the user request forwarding process before, in parallel with, or after creating the user request processing container. In some embodiments, the user request processing container can be dedicated to the user device. In such embodiments, user requests received from another different user device can be processed in another user request processing container different from the user request processing container created at block 520.

Operations proceed to block 522, where the server can process user requests received from the user device using the created user request processing container. The user request forwarding process can use an identifier associated with the user request processing container to forward user requests received from the user device to the user request processing container, and/or to forward responses for the user request provided by the user request processing container to the user device. In some embodiments, an unprivileged process can be established inside the user request processing container to process the user requests and to provide the responses.

If, at block 524, the user requests from the user device are completed, the operations end. If, at block 524, the user requests from the user device are not completed, the operations can proceed back to block 522 for further user requests to be processed.

Figure 6:
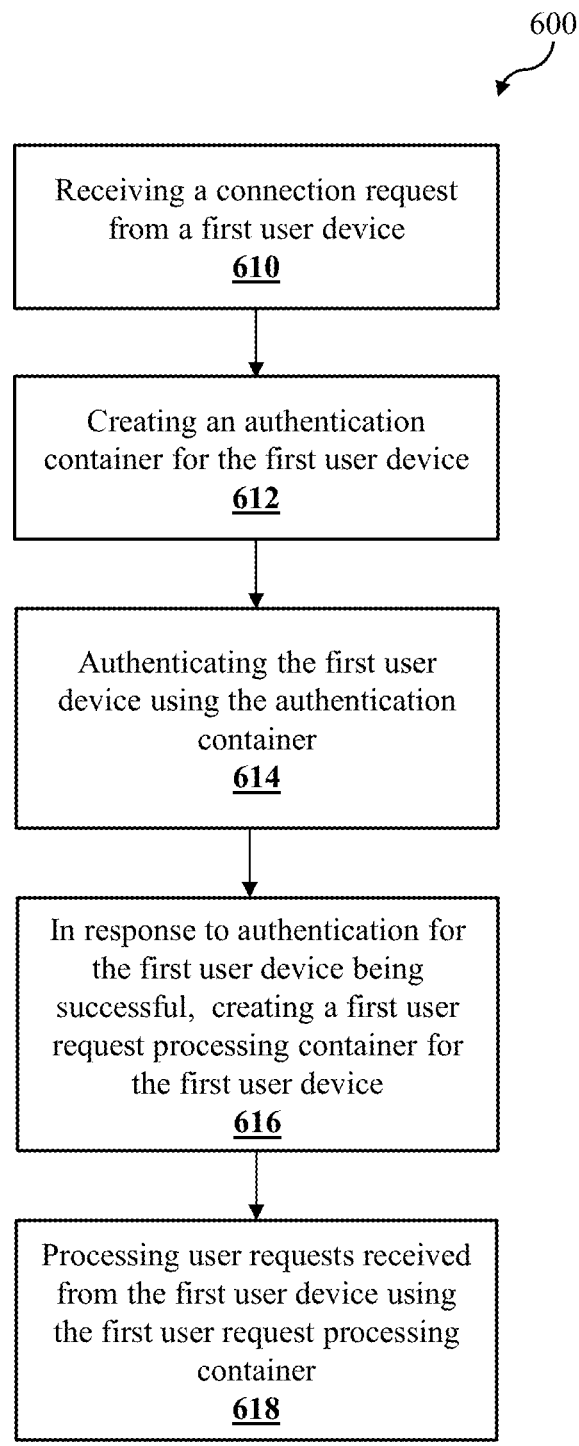
FIG. 6 depicts another flow chart of an example method for user request processing, according to an embodiment of the present invention.

FIG. 6 shows a flowchart of operations 600 for user request processing according to an embodiment of the present disclosure. The operations 600 can be implemented, for example, by the computer system/server 12 of FIG. 1, by the server 411 of FIG. 4, or by another computing device provided in a network environment. It should be noted that the operations 600 are only illustrative and are not intended to suggest any limitation as to the scope of use or functionality of embodiments of the present invention.

Operations begin at block 610, where a computing system receives a connection request from a first user device. Operations proceed to block 612, where the computing system creates an authentication container for the first user device. Operations proceed to block 614, where the computing system can attempt to authenticate the first user device using the authentication container. In response to authentication for the first user device being successful at block 614, operations proceed to block 616, where the computing system can create a first user request processing container for the first user device. Operations proceed to block 618, where the computing system can process user requests received from the first user device using the first user request processing container.

According to aspects of the present disclosure, in some embodiments, the created first user request processing container can be dedicated to the first user device. User requests received from a second user device can be processed in a second user request processing container different from the first user request processing container.

It should be noted that the operations associated with user request processing according to embodiments of the present disclosure could be implemented by the computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a connection request from a first user device and a second user device;
creating an authentication container for the first user device and an authentication container for the second user device;
creating an authentication forwarding process shared among the authentication container for the first user device and the authentication container for the second user device;
mapping, by the authentication forwarding process, an authentication request with an identifier associated with the authentication container for the first user device;
authenticating the first user device using the authentication container for the first user device;
forwarding, by the authentication forwarding process, the authentication request from the authentication container for the first user device to the first user device;

in response to authentication for the first user device being successful, creating a first user request processing container for the first user device and a user request forwarding process;

wherein access restricted resources assigned to the first user request processing container are not assigned to a second user request processing container created for the second user device, and where the second user device cannot access the access restricted resources;

providing to the user request forwarding process, an identifier associated with the first user request processing container;

mapping, by the user request forwarding process, user requests containing the identifier associated with the first user request processing container;

delivering, by the user request forwarding process, user requests from the first device to the first user request processing container; and processing the user requests delivered by the first user request forwarding process using the first user request processing container.

2. The computer-implemented method of claim 1, wherein the first user request processing container is dedicated to the first user device.

3. The computer-implemented method of claim 1, further comprising:

mapping, by the authentication forwarding process, authentication requests with identifiers associated with the authentication container for the second user device to the authentication container for the second user device; and forwarding, by the authentication forwarding process, the authentication requests from the authentication container for the second user device to the second user device.

4. The computer-implemented method of claim 3, further comprising:

in response to authentication for the second user device being successful, creating a second user request processing container;

providing to the user request forwarding process, an identifier associated with the second user request processing container; and mapping, by the user request forwarding process, user requests containing the identifier associated with the second user request processing container.

5. The computer-implemented method of claim 4, further comprising:

delivering, by the user request forwarding process, user requests from the second device to the second user request processing container; and processing the user requests delivered by the second user request forwarding process using the second user request processing container.

6. The computer-implemented method of claim 1, wherein authenticating the first user device using the authentication container further comprises:

receiving an authentication response from the first user device using the authentication forwarding process; and providing the authentication response to the authentication container for the first user device based on the identifier associated with the authentication container for the first user device.

7. The computer-implemented method of claim 1, wherein computing resources assigned to the first user request processing container are determined based on features of the first user device.

8. The computer-implemented method of claim 1, wherein responses for the user requests containing the identifier associated with the first user request processing container are provided in an unprivileged process inside the first user request processing container established to process the user requests.

9. The computer-implemented method of claim 1, wherein the user request forwarding process is an unprivileged process.

10. A computer system, comprising:

one or more processors; and a computer-readable memory coupled to the processors, the computer-readable memory including instructions that when executed by the processors perform operations of:

receiving a connection request from a first user device and a second user device; creating an authentication container for the first user device and an authentication container for the second user device;

creating an authentication forwarding process shared among the authentication container for the first user device and the authentication container for the second user device;

mapping, by the authentication forwarding process, an authentication request with an identifier associated with the authentication container for the first user device;

authenticating the first user device using the authentication container for the first user device;

forwarding, by the authentication forwarding process, the authentication request from the authentication container for the first user device to the first user device;

in response to authentication for the first user device being successful, creating a first user request processing container for the first user device and a user request forwarding process;

wherein access restricted resources assigned to the first user request processing container are not assigned to a second user request processing container created for the second user device, and where the second device cannot access the access restricted resource;

providing to the user request forwarding process, an identifier associated with the first user request processing container;

mapping, by the user request forwarding process, user requests containing the identifier associated with the first user request processing container;

delivering, by the user request forwarding process, user requests from the first device to the first user request processing container; and processing the user requests delivered by the first user request forwarding process using the first user request processing container.

11. The computer system of claim 10, wherein the first user request processing container is dedicated to the first user device.

12. The computer system of claim 10, wherein the operations further comprise:

mapping, by the authentication forwarding process, authentication requests with identifiers associated with the authentication container for the second user device to the authentication container for the second user device; and forwarding, by the authentication forwarding process, the authentication requests from the authentication container for the second user device to the second user device.

13. The computer system of claim 12, wherein the operations further comprise:

in response to authentication for the second user device being successful, creating a second user request processing container;

providing to the user request forwarding process, an identifier associated with the second user request processing container; and mapping, by the user request forwarding process, user requests containing the identifier associated with the second user request processing container.

14. The computer system of claim 13, wherein processing user requests received from the first user device using the first user request processing container further comprises:

delivering, by the user request forwarding process, user requests from the second device to the second user request processing container; and processing the user requests delivered by the second user request forwarding process using the second user request processing container.

15. The computer system of claim 10, wherein authenticating the first user device using the authentication container further comprises:

receiving an authentication response from the first user device using the authentication forwarding process; and providing the authentication response to the authentication container for the first user device based on the identifier associated with the authentication container for the first user device.

16. The computer system of claim 10, wherein computing resources assigned to the first user request processing container are determined based on features of the first user device.

17. A computer program product comprising a computer readable storage medium having stored thereon:

program instructions programmed to receive a connection request from a first user device and a second user device;

program instructions programmed to create an authentication container for the first user device and an authentication container for the second user device;

program instructions programmed to create an authentication forwarding process shared among the authentication container for the first user device and the authentication container for the second user device;

program instructions programmed to map, by the authentication forwarding process, an authentication request with an identifier associated with the authentication container for the first user device;

program instructions programmed to authenticate the first user device using the authentication container for the first user device;

program instructions programmed to forward, by the authentication forwarding process, the authentication request from the authentication container for the first user device to the first user device;

program instructions programmed to create, in response to authentication for the first user device being successful, a first user request processing container for the first user device and a user request forwarding process;

program instructions programmed wherein access restricted resources assigned to the first user request processing container are not assigned to a second user request processing container created for the second user device, and where the second device cannot access the access restricted resource;

program instructions programmed to provide to the user request forwarding process, an identifier associated with the first user request processing container;

program instructions programmed to map, by the user request forwarding process, user requests containing the identifier associated with the first user request processing container;

program instructions programmed to deliver, by the user request forwarding process, user requests from the first device to the first user request processing container; and program instructions programmed to process the user requests delivered by the first user request forwarding process using the first user request processing container.

18. The computer program product of claim 17, wherein the first user request processing container is dedicated to the first user device.

* * * * *